US012718808B2

(12) United States Patent
Zheng et al.

(10) Patent No.: US 12,718,808 B2
(45) Date of Patent: Aug. 25, 2026

(54) SUBTITLE GENERATION METHOD, APPARATUS, ELECTRONIC DEVICE, STORAGE MEDIUM AND PROGRAM

(71) Applicant: Beijing Zitiao Network Technology Co., Ltd., Beijing (CN)

(72) Inventors: Xin Zheng, Beijing (CN); Lelai Deng, Beijing (CN); Keyu Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 161 days.

(21) Appl. No.: 18/573,404

(22) PCT Filed: May 31, 2023

(86) PCT No.: PCT/CN2023/097415
§ 371 (c)(1),
(2) Date: Dec. 21, 2023

(87) PCT Pub. No.: WO2023/232073
PCT Pub. Date: Dec. 7, 2023

(65) Prior Publication Data

US 2024/0371370 A1 Nov. 7, 2024

(30) Foreign Application Priority Data

May 31, 2022 (CN) ......................... 202210615156.5

(51) Int. Cl.
*G10L 15/187* (2013.01)
*G10L 15/04* (2013.01)
(Continued)

(52) U.S. Cl.
CPC ............ *G10L 15/187* (2013.01); *G10L 15/04* (2013.01); *G10L 15/1815* (2013.01);
(Continued)

(58) Field of Classification Search
None
See application file for complete search history.

(56) References Cited

U.S. PATENT DOCUMENTS

2007/0253678 A1* 11/2007 Sarukkai ............ G06F 16/7844 707/E17.028
2018/0189249 A1* 7/2018 Berman ............... G06F 40/166
(Continued)

FOREIGN PATENT DOCUMENTS

CN 105704538 A 6/2016
CN 110035326 A 7/2019
(Continued)

OTHER PUBLICATIONS

China Patent Application No. 202210615156.5; Notice for Registration; dated Jun. 17, 2026; 10 pages.
(Continued)

*Primary Examiner* — Daniel C Washburn
*Assistant Examiner* — Tyler Becker
(74) *Attorney, Agent, or Firm* — BakerHostetler

(57) ABSTRACT

The present disclosure relates to a subtitle generation method, a subtitle generation apparatus, an electronic device, a storage medium and a program. The method includes: extracting audio data from a video to be processed, and performing speech recognition on the audio data to acquire text data corresponding to the audio data; acquiring a plurality of segmentation positions of the text data determined based on syntactic analysis, and acquiring pronunciation object information and timestamp information of audio segments corresponding to characters comprised in the text data; segmenting the text data to acquire a plurality of text segments according to the plurality of segmentation positions, the pronunciation object information and the timestamp information of the audio segments corresponding to the characters, wherein audio segments corresponding to
(Continued)

characters in a text segment belong to a same pronunciation object, and a duration of a blank segment in the audio segments corresponding to the text segment is less than a preset duration; merging the plurality of text segments according to semantics of the text segments and the time-stamp information of the audio segments corresponding to the characters to acquire a plurality of merged segments which have smooth semantics and meet a preset requirement of single subtitle length; and generating subtitle data corresponding to the video to be processed according to the plurality of merged segments.

19 Claims, 6 Drawing Sheets

(51) Int. Cl.

| | |
|---|---|
| ***G10L 15/18*** | (2013.01) |
| ***G10L 25/57*** | (2013.01) |
| ***G11B 27/036*** | (2006.01) |
| ***G11B 27/34*** | (2006.01) |

(52) U.S. Cl.
CPC ............ *G10L 25/57* (2013.01); *G11B 27/036* (2013.01); *G11B 27/34* (2013.01)

(56) References Cited

U.S. PATENT DOCUMENTS

| | | | | |
|---|---|---|---|---|
| 2018/0277142 | A1* | 9/2018 | Veeramani | G10L 25/57 |
| 2020/0051582 | A1* | 2/2020 | Gilson | H04N 21/233 |
| 2020/0404386 | A1* | 12/2020 | Mccartney, Jr. | G06F 40/58 |
| 2021/0073551 | A1* | 3/2021 | Li | G06F 40/205 |
| 2022/0122609 | A1* | 4/2022 | Romano | G10L 15/18 |
| 2022/0383856 | A1* | 12/2022 | Nama | G10L 15/32 |

FOREIGN PATENT DOCUMENTS

| | | | |
|---|---|---|---|
| CN | 112002328 | A | 11/2020 |
| CN | 112995736 | A | 6/2021 |
| CN | 112995754 | A | 6/2021 |
| CN | 113225612 | A | 8/2021 |
| CN | 113326844 | A | 8/2021 |
| CN | 113889113 | A | 1/2022 |
| EP | 3817395 | A1 | 5/2021 |
| WO | WO 2019/125704 | A1 | 6/2019 |
| WO | WO 2019/164535 | A1 | 8/2019 |

OTHER PUBLICATIONS

Karakanta et al.; “MuST-Cinema: a Speech-to-Subtitles corpus”; arXiv:2002.10829; Feb. 2020; 8 pages.

* cited by examiner

SUBTITLE GENERATION METHOD, APPARATUS, ELECTRONIC DEVICE, STORAGE MEDIUM AND PROGRAM

CROSS-REFERENCE TO RELATED APPLICATIONS

The present disclosure is a U.S. National Stage Application under 35 U.S.C. § 371 of International Patent Application No. PCT/CN2023/097415, filed on May 31, 2023, which is based on and claims priority of Chinese application for invention No. 202210615156.5, filed on May 31, 2022, both of which are hereby incorporated into this disclosure by reference in their entireties.

TECHNICAL FIELD

The present disclosure relates to the technical field of multimedia, and in particular, to a subtitle generation method, a subtitle generation apparatus, an electronic device, a storage medium and a program.

BACKGROUND

Subtitles refer to text content generated based on dialogue(s), explanatory information or other information in a video, and subtitles are displayed in frame images of the video. Because subtitles can help users understand content of the video, it is extremely important to generate subtitles for the video.

In the related art, the way to generate subtitles for a video is usually to extract audio from the video after the video is generated, perform speech recognition on the extracted audio to obtain a text corresponding to the audio, and then perform punctuation recovery on the text to obtain a text segment, and display the text segment in a corresponding video frame image according to a time corresponding to the text segment.

SUMMARY

In a first aspect, an embodiment of the present disclosure provides a subtitle generation method, comprising:

- extracting audio data from a video to be processed, and performing speech recognition on the audio data to acquire text data corresponding to the audio data;
- acquiring a plurality of segmentation positions of the text data determined based on syntactic analysis, and acquiring pronunciation object information and timestamp information of audio segments corresponding to characters comprised in the text data;
- segmenting the text data to acquire a plurality of text segments according to the plurality of segmentation positions, the pronunciation object information and the timestamp information of the audio segments corresponding to the characters, wherein audio segments corresponding to characters in a text segment belong to a same pronunciation object, and a duration of a blank segment in the audio segments corresponding to the text segment is less than a preset duration;
- merging the plurality of text segments according to semantics of the text segments and the timestamp information of the audio segments corresponding to the characters to acquire a plurality of merged segments which have smooth semantics and meet a preset requirement of single subtitle length; and

- generating subtitle data corresponding to the video to be processed according to the plurality of merged segments.

In some embodiments, the merging the plurality of text segments according to the semantics of the text segments and the timestamp information of the audio segments corresponding to the characters comprises:

- merging the plurality of text segments according to at least one of: whether merged adjacent text segments meet a preset requirement of single subtitle length, whether semantics corresponding to merged adjacent text segments are smooth or a pause duration between the adjacent text segments.

In some embodiments, the merging the plurality of text segments according to the semantics of the text segments and the timestamp information of the audio segments corresponding to the character comprises:

- determining whether the adjacent text segments meet a merging condition according to whether the merged adjacent text segments meet the preset requirement of single subtitle length;
- determining whether the adjacent text segments meet the merging condition according to whether the semantics corresponding to the merged adjacent text segments are smooth;
- for each text segment of the text segments, in response to the text segment and two adjacent text segments before and after the text segment meeting the merging condition, merging the text segment and one of the adjacent text segments with a pause duration between the text segment and the adjacent text segment shorter than a pause duration between the text segment and the other of the adjacent text segments.

In some embodiments, the preset requirement of single subtitle length comprises at least one of: a Characters Per Second (CPS) requirement or a maximum display duration requirement of a single subtitle in a video.

In some embodiments, the segmenting the text data to acquire the plurality of text segments according to the plurality of segmentation positions, the pronunciation object information and the timestamp information of the audio segments corresponding to the characters comprises:

- inputting the text data into a text processing module to acquire the plurality of text segments output from the text processing module,
- wherein the text processing module comprises: a sub-module for text segmentation based on the plurality of segmentation positions, a sub-module for text segmentation based on pronunciation object information of the audio segments corresponding to the characters, and a sub-module for text segmentation based on the timestamp information of the audio segments corresponding to the characters.

In some embodiments, the text processing module comprises:

- a first segmentation module for segmenting the text data based on a punctuation analysis;
- a second segmentation module for segmenting the text data based on syntactic characteristics;
- a third segmentation module for segmentation based on the pronunciation object information corresponding to the audio data; and
- a fourth segmentation module for segmentation based on the timestamp information of the audio segments corresponding to the characters in the text data.

In some embodiments, the first segmentation module, the second segmentation module, the third segmentation module, and the fourth segmentation module are connected in a serial manner, and an input of the third segmentation module comprises an output of the second segmentation module and the audio data, and an input of the fourth segmentation module comprises an output of the third segmentation module and the timestamp information of the audio segments corresponding to the characters.

In some embodiments, the first segmentation module, the second segmentation module, the third segmentation module and the fourth segmentation module are connected in a parallel manner, and inputs of the first segmentation module and the second segmentation module comprise the text data, an input of the third segmentation module comprises the text data and the audio data, and an input of the fourth segmentation module comprises the timestamp information of the audio segments corresponding to the characters in the text data and the text data.

In some embodiments, the subtitle data is a SubRip Text (SRT) file.

In some embodiments, the subtitle generation method further comprises:

fusing the subtitle data with the video to be processed to obtain a target video with subtitles.

In a second aspect, an embodiment of the present disclosure provides a subtitle generation apparatus, comprising:

an audio processing module configured to extract audio data from a video to be processed, and performing speech recognition on the audio data to acquire text data corresponding to the audio data;

an acquisition module configured to acquire a plurality of segmentation positions of the text data determined based on syntactic analysis, and acquire pronunciation object information and timestamp information of audio segments corresponding to characters comprised in the text data;

a text segmentation module configured to segment the text data to acquire a plurality of text segments according to the plurality of segmentation positions, the pronunciation object information and the timestamp information of the audio segments corresponding to the characters, wherein audio segments corresponding to characters in a text segment belong to a same pronunciation object, and a duration of a blank segment in the audio segments corresponding to the text segment is less than a preset duration;

a merging module configured to merge the plurality of text segments according to semantics of the text segments and the timestamp information of the audio segments corresponding to the characters to acquire a plurality of merged segments which have smooth semantics and meet a preset requirement of single subtitle length; and a generation module configured to generate subtitle data corresponding to the video to be processed according to the plurality of merged segments.

In a third aspect, an embodiment of the present disclosure further provides an electronic device, comprising:

a memory; and a processor coupled to the memory, the processor configured to perform the subtitle generation method according to any one of the first aspect and the first aspect based on instructions stored in the memory.

In a fourth aspect, an embodiment of the present disclosure further provides a non-transitory readable storage medium, on which a computer program is stored, where the program, when executed by a processor, implements the subtitle generation method according to any one of the first aspect and the first aspect.

In a fifth aspect, an embodiment of the present disclosure further provides a non-transitory computer program product, comprising: the electronic device executes the computer program product, so that the electronic device implements the subtitle generation method according to any one of the first aspect and the first aspect.

In a sixth aspect, an embodiment of the present disclosure further provides a computer program, comprising: instructions which, when executed by a processor, cause the processor to perform the subtitle generation method of any one of the first aspect and the first aspect.

BRIEF DESCRIPTION OF THE DRAWINGS

The accompanying drawings, which are incorporated in and constitute a part of this description, illustrate embodiments consistent with the present disclosure and, together with the description, serve to explain the principles of the disclosure.

In order to more clearly illustrate technical solutions in the embodiments of the present disclosure or the prior art, the drawings needed in the description of the embodiments or the prior art will be briefly described below, and it is obvious for those ordinary skilled in the art that other drawings can be obtained according to these drawings without inventive labor.

DETAILED DESCRIPTION

Figure 1:
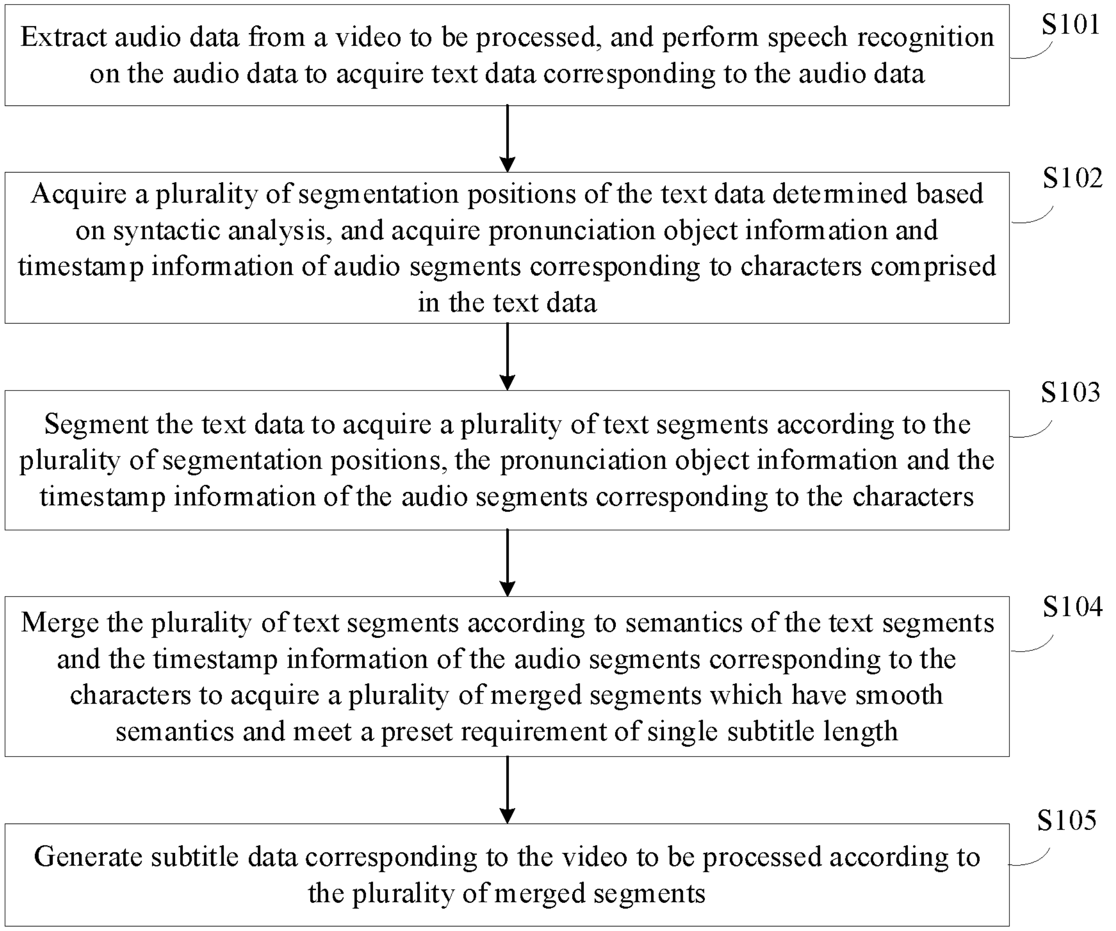
FIG. 1 is a flow diagram of a subtitle generation method according to an embodiment of the present disclosure.

In order that the above objects, features and advantages of the present disclosure may be more clearly understood, aspects of the present disclosure will be further described below. It should be noted that, in the case of no conflict, the embodiments and features in the embodiments of the present disclosure may be combined with each other.

In the following description, numerous specific details are set forth in order to provide a thorough understanding of the present disclosure, but the present disclosure may be practiced otherwise than as described herein; it is to be understood that the embodiments disclosed in the specification are only a few embodiments of the present disclosure, and not all embodiments.

Currently, generating subtitles for a video generally comprises the following processes: extracting audio data from the video, performing speech recognition on the audio data to acquire text data corresponding to the audio data, and performing punctuation recovery on the text data to acquire segmented text segments; and generating subtitle data according to the time of video segments corresponding to the text segments, and fusing the subtitle data and the video to obtain a video with subtitles. By adopting the method, the processing of segmenting the text data depends on the punctuation recovery result, so that a length of sentence of a single subtitle cannot be controlled well, thus affecting the typesetting of the subtitle and a display time of the subtitle in the video, reducing a subjective experience of the subtitle and failing to play a better auxiliary understanding effect.

For example, when a length of a single subtitle is long, that is, the single subtitle data contains a large number of characters, since a size of a display screen of an electronic device is limited, the subtitle needs to be folded and displayed, that is, multiple lines need to be displayed. However, when the number of lines occupied by the subtitle is large, an area covered by the subtitle is enlarged, which may block more video pictures and affect users' viewing of the content of the video. In addition, when the length of the single subtitle is long, a display time of the single subtitle in the video will increase, which will also affect the users' viewing of the video content.

For another example, some single subtitles have short sentences with a fast speech speed and short length, that is, the single subtitle data contains a small number of characters, and the pronunciation duration of each character is short. Therefore, the display duration of the subtitle in the video is short, and users may not have time to look at the subtitle content in detail, thus failing to achieve the purpose of auxiliary understanding of the subtitle.

For another example, the same text with different pause duration may express different semantics, and the subtitles obtained by punctuation recovery may not accurately express the semantics of the same text at different audio positions.

Based on the above, the present disclosure provides a subtitle generation method, comprising: extracting audio data from a video to be processed, and performing speech recognition on the audio data to acquire text data corresponding to the audio data; acquiring a plurality of segmentation positions of the text data determined based on syntactic analysis, and acquiring pronunciation object information and timestamp information of audio segments corresponding to characters comprised in the text data; segmenting the text data to acquire a plurality of text segments which meet a requirement according to the plurality of segmentation positions, the pronunciation object information and the timestamp information of the audio segments corresponding to the characters; merging the plurality of text segments according to semantics of the text segments and the timestamp information of the audio segments corresponding to the characters to acquire a plurality of merged segments which have smooth semantics and meet a preset requirement of single subtitle length; and generating subtitle data corresponding to the video to be processed according to the plurality of merged segments. The method of the present disclosure can better control the length of sentence in a single subtitle and the display duration of the single subtitle in the video by combining the characteristics of the text dimension and the audio dimension to perform segmentation and merging, so that the auxiliary understanding effect of the subtitle is greatly improved. In addition, in the process of merging and segmentation, a blank duration between audio segments corresponding to the characters is fully considered, so that the same speech content expressing different meanings is segmented and merged in different ways, so the method can effectively reduce the occurrence of ambiguity.

Illustratively, the subtitle generation method provided by the present embodiments may be executed by an electronic device. The electronic device may be a tablet computer, a mobile phone (such as a folding screen mobile phone, a large screen mobile phone, etc.), a wearable device, a vehicle-mounted device, an Augmented Reality (AR)/Virtual Reality (VR) device, a notebook computer, an ultra-mobile personal computer (UMPC), a netbook, a Personal Digital Assistant (PDA), a smart television, a smart screen, a high definition television, a 4K television, a smart sound box, an internet of things (IOT) device such as a smart projector, and the specific type of the electronic device is not limited in the present disclosure. The present disclosure does not limit the type of operating system of the electronic device. For example, Android systems, Linux systems, Windows systems, iOS systems, etc.

Based on the foregoing description, an embodiment of the present disclosure will use an electronic device as an example, and elaborate the subtitle generation method provided by the present disclosure in details in conjunction with the accompanying drawings and application scenarios.

FIG. 1 is a flow diagram of a subtitle generation method provided by an embodiment of the present disclosure. Referring to FIG. 1, the method of the present embodiment comprises the following steps.

In step S101, audio data is extracted from a video to be processed, and speech recognition is performed on the audio data to acquire text data corresponding to the audio data.

The video to be processed is a video to be added with subtitles, and the electronic device may acquire the video to be processed, where the video to be processed may be recorded by a user through the electronic device, and may also be downloaded from a network, or may also be created by the user through video processing software. The present disclosure does not limit the implementation mode of acquiring the video to be processed. And the present disclosure does not limit the video content, duration, storage format, definition and other parameters in the video to be processed.

The electronic device can extract the audio data in the video to be processed and convert the audio data into the text data. For example, the electronic device may convert the audio data into the text data through a speech recognition model, and the type and parameters of the speech recognition model are not limited in the present disclosure. For example, the speech recognition model may be a deep neural network module, a convolutional neural network model, or the like. Alternatively, the electronic device may utilize other existing speech recognition tools or methods to convert the audio data into the text data. The present disclosure does not limit the implementation mode of speech recognition performed by the electronic device.

The text data can comprise a continuous sequence of characters, for example, the text data comprises "I went to the playground with my mom and dad today and I am very happy", which does not comprise punctuation. It should be noted that, since the audio data may correspond to one or more language types, the generated text data may also comprise characters corresponding to one or more language types, respectively.

Of course, during speech recognition, the audio may also be converted into one language as much as possible, which is convenient for the subsequent segmentation processing. For example, a speech recognition result obtained for an audio segment is "Ni Hao" (the meaning of "hello" in Chinese), or the speech recognition result obtained for the audio clip is “hello”. Because the proportion of Chinese characters in the whole text data is high, the former can be selected if the purpose is to improve the consistency of language types in subtitles, and the latter can be selected if the purpose is to increase the interest of subtitles.

In Step S102, a plurality of segmentation positions of the text data determined based on syntactic analysis and pronunciation object information and timestamp information of audio segments corresponding to characters comprised in the text data are acquired.

The electronic device can analyze the text data through a syntactic analysis model to obtain the plurality of segmentation positions, wherein the syntactic analysis may comprise: analysis of punctuation position, syntactic characteristic analysis and the like. A plurality of clause positions can be obtained through the syntactic analysis, wherein the clause positions are segmentation positions.

The electronic device can identify audio segments corresponding to different pronunciation objects by performing pronunciation object identification on the audio data, and then combines a correlation between the audio segments corresponding to the different pronunciation objects and the text data to obtain the pronunciation object information of the audio segments corresponding to the characters.

The electronic device may obtain the timestamp information of the audio segments corresponding to the characters by segmenting the audio data, where the timestamp information may comprise a start time and an end time.

In Step S103, the text data is segmented to acquire a plurality of text segments according to the plurality of segmentation positions, the pronunciation object information and the timestamp information of the audio segments corresponding to the characters.

In each of the text segments obtained by segmentation, audio segments corresponding to characters in the text segment belong to a same pronunciation object, and a duration of a blank segment in the audio segments corresponding to the text segment is less than a preset duration.

The segmenting the text data into the plurality of text segments can be realized by a text processing module. The text processing module may comprise a plurality of sub-modules, each of the sub-modules is configured to segment the input text data according to the characteristics of the one or more dimensions, and the text data can be segmented into a plurality of first text segments after being processed by the plurality of sub-modules.

Figure 2:
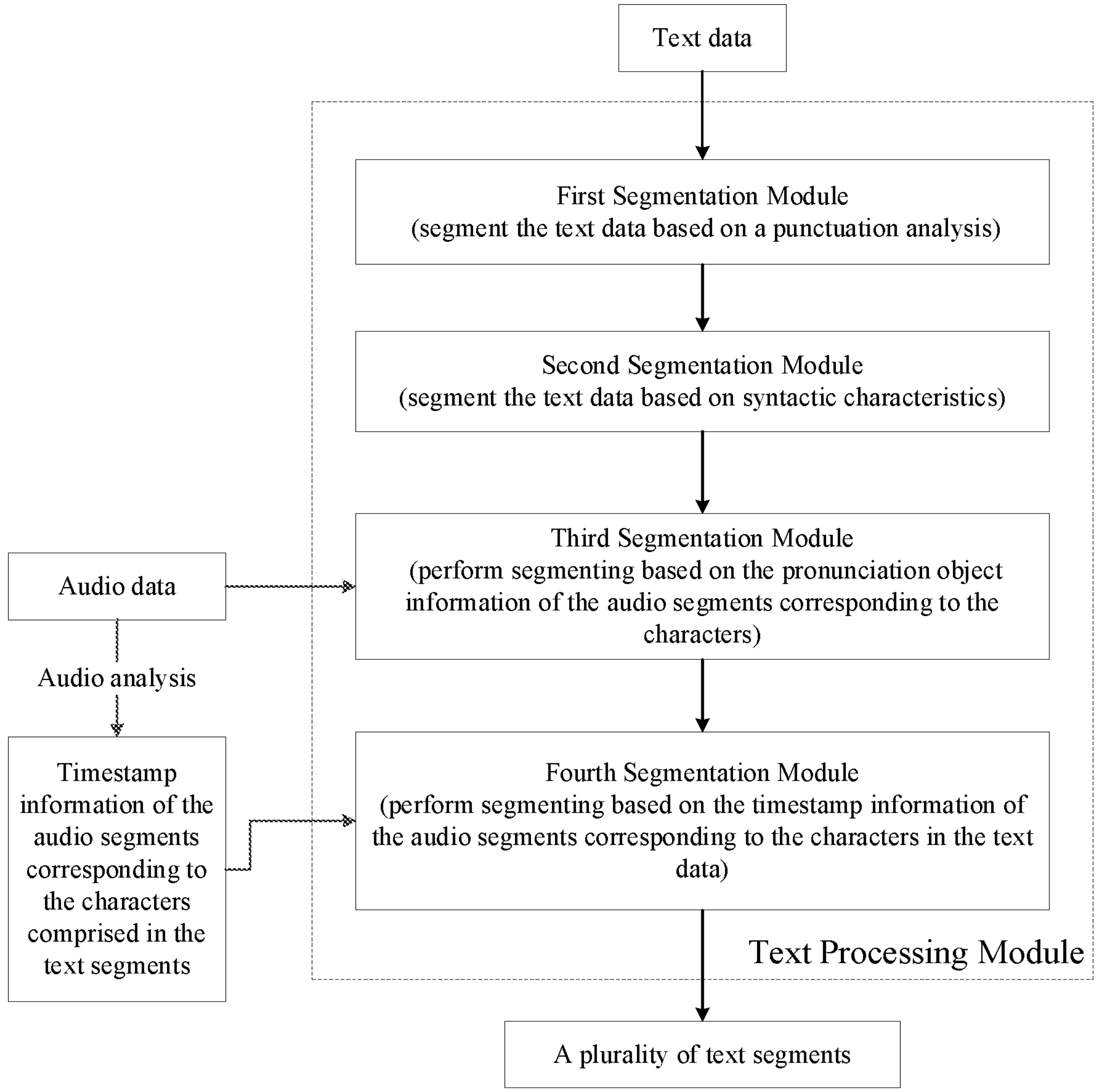
FIG. 2 is a flow diagram of a subtitle generation method provided by an embodiment of the present disclosure.
Figure 3:
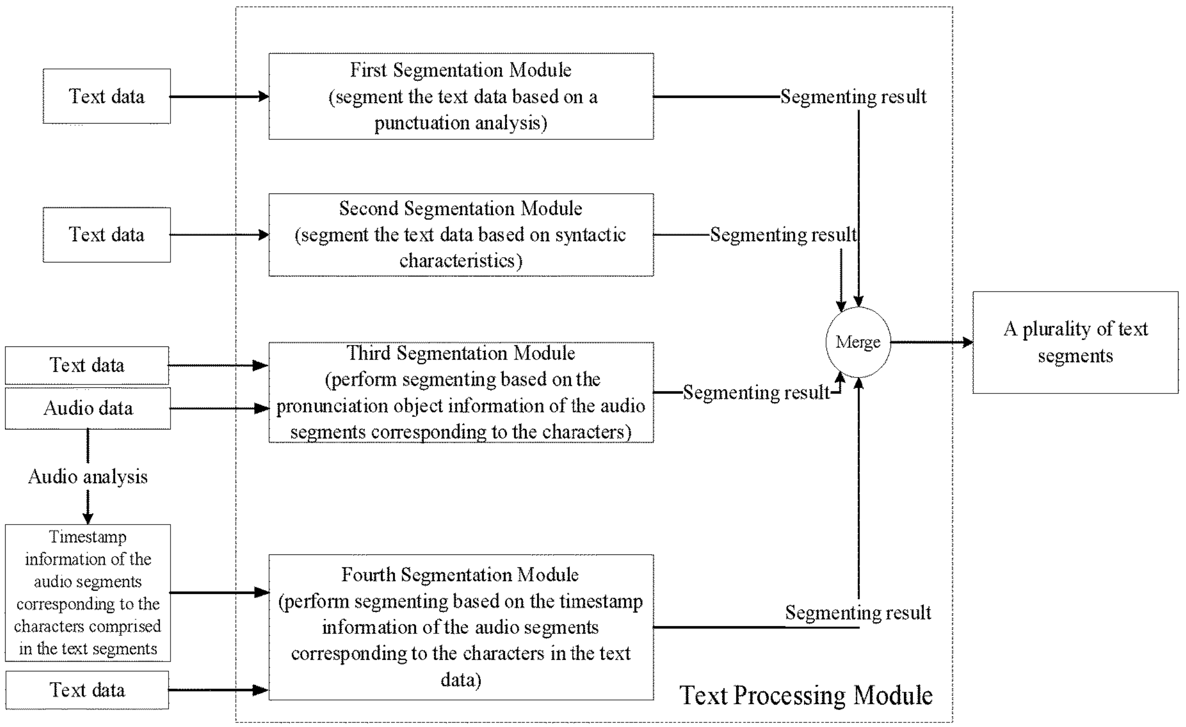
FIG. 3 is a flow diagram of a subtitle generation method provided by an embodiment of the present disclosure.

The segmentation of the text data by the text processing module will be illustrated by the embodiments shown in FIG. 2 and FIG. 3.

In Step S104, the plurality of text segments are merged according to semantics of the text segments and the timestamp information of the audio segments corresponding to the characters to acquire a plurality of merged segments which have smooth semantics and meet a preset requirement of single subtitle length.

In some embodiments, it is determined whether the adjacent text segments meet a merging condition according to whether the merged adjacent text segments meet the preset requirement of single subtitle length. The semantics (meaning) of the text segments can be obtained by performing semantic analysis on the text segments. It can be judged whether the contents to be expressed by the adjacent text segments are continuous and smooth based on the semantics, which then can be used as a combination basis to guide the combination of the text segments, so as to avoid merging text segments with different semantics and bringing bad experiences to users.

In some embodiments, a pause duration between the text segments can be obtained according to the timestamp information of the audio segments corresponding to the characters. Specifically, the pause duration between the adjacent text segments may be determined according to the end time of an audio segment corresponding to the last character of the previous text segment and the start time of an audio segment corresponding to the first character of the next text segment. During the merging process, two adjacent text segments with shorter pause duration between the text segments may tend to be merged. A shorter pause duration can indicate that the contents to be expressed in the audio data are more continuous, and merging them together can express the contents in the audio data more completely, which is more conducive to the user’s understanding.

In addition, in the merging process, it is also necessary to determine whether merged text segments meets the preset requirement of single subtitle length, so as to control the length of sentence of the subtitle and also control the display time of the subtitle on the screen.

Merging the text segments by combining the above three aspects can get merged segments with smooth semantics and meeting the preset requirement of subtitle sentence length.

For example, text segment 1, text segment 2, and text segment 3 are three consecutive first text segments. It is determined based on semantics that the text segment 1 and the text segment 2 can be merged, and the text segment 2 and the text segment 3 can be merged, and the pause duration between the text segment 1 and the text segment 2 is t1, and the pause duration between the text segment 2 and the text segment 3 is t2, and t1 is less than t2, then it is more reasonable to merge the text segment 1 and the text segment 2. In addition, after the text segment 1 and the text segment 2 are merged, they can meet the preset requirement of single subtitle length, and thus meet the conditions of merging. Therefore, the text segment 1 can be merged with the text segment 2.

It should be noted that the merged segment obtained by merging the text segment 1 and the text segment 2 may be a merged segment corresponding to the single subtitle that is finally obtained, or it may be necessary to merge the merged segment with the adjacent text segment 3 to obtain a merged segment corresponding to the single subtitle.

In Step S105, subtitle data corresponding to the video to be processed is generated according to the plurality of merged segments.

Each merged segment corresponds to one subtitle, and a plurality of merged segments are converted into a subtitle file in a preset format in sequence, so as to obtain the subtitle data corresponding to the video to be processed.

The subtitle data may be, but is not limited to, an SRT file.

The method provided in this embodiment, by combining the characteristics of text dimension and audio dimension to segment the text data and merge the segmented text segments, can better control the sentence length of a single subtitle and the display time of a single subtitle in the video without affecting the semantic understanding, so that the auxiliary understanding effect of subtitles is greatly improved. In addition, the method can effectively reduce the occurrence of ambiguity.

As can be known by referring to the description of the embodiment shown in FIG. 1, when an electronic device implements segmentation of the text data through a text processing module (which may also be understood as a text processing model), a connection sequence of sub-modules in the text processing module may be flexibly set. FIGS. 2 and 3 illustrate two different ways, respectively.

It is assumed that in the embodiments shown in FIG. 2 and FIG. 3, the text processing module comprises: a first segmentation module for segmenting the text data based on a punctuation analysis, a second segmentation module for segmenting the text data based on syntactic characteristics, a third segmentation module for segmentation based on the pronunciation object information corresponding to the audio data, and a fourth segmentation module for segmentation based on the timestamp information of the audio segments corresponding to the characters in the text data.

FIG. 2 is a schematic structural diagram of a text processing module provided by an embodiment of the present disclosure. Referring to FIG. 2, an output end of the first segmentation module is connected to an input end of the second segmentation module, an output end of the second segmentation module is connected to an input end of the third segmentation processing module, and an output end of the third segmentation module is connected to an input end of the fourth segmentation module. Combined with the structure of the text processing module in the embodiment shown in FIG. 2, the respective segmentation modules comprised in the text processing module may be understood as being connected in a serial manner.

The first segmentation module is used for receiving the text data as input, performing punctuation analysis (which can also be understood as punctuation recovery processing) on the text data to obtain clause positions of a plurality of punctuation symbols, and segmenting the text data into text segments based on the clause positions; the text segments output by the first segmentation module are input into the second segmentation module, the second segmentation module performs syntactic characteristic analysis on the text segments to determine a plurality of segmentation positions, and the text segments of the first segmentation module can be segmented again or adjusted based on the plurality of segmentation positions to obtain a plurality of text segments; the text segments and the audio data output by the second segmentation module are input into the third segmentation module, the third segmentation module performs pronunciation object recognition on the audio data, determines a start position and an end position of each of the audio segments corresponding to different pronunciation objects, and then determines the segmentation positions in the text data based on the audio segments corresponding to the different pronunciation objects, and segments the text segments again based on the determined segmentation positions so that each of the segmented text segments may correspond to a single pronunciation object; then, the fourth segmentation module determines a pause duration of adjacent characters according to the start time and the end time of each of the audio segments corresponding to the characters respectively, and based on a comparison result between a pause duration of adjacent characters and a preset duration (i.e., a length threshold), determine the adjacent characters whose pause duration is less than the preset duration as one text segment, and segments the adjacent characters whose pause duration is greater than or equal to the preset duration into two different text segments. On the basis, a plurality of text segments output by the last sub-module (namely, the fourth segmentation module) comprised in the text processing module are the final segmentation result corresponding to the text data.

The present disclosure does not limit the value of the preset duration, for example, it can be 0.4 second, 0.5 second, 0.6 second, etc. The preset duration can be obtained by statistical analysis of the pause duration between audio segments corresponding to various characters in a large amount of audio data.

As a possible implementation, the segmentation modules comprised in the text processing module may be implemented by using corresponding machine learning models, respectively, for example, the first segmentation module may be implemented based on a pre-trained punctuation recovery processing model, the second segmentation module may be implemented based on a pre-trained syntactic characteristic analysis model, the third segmentation module, i.e., a pronunciation object segmentation processing module, may be implemented based on a pre-trained audio processing model, and the fourth segmentation module, i.e., a pause duration segmentation module, may be implemented based on a pre-trained character processing model. The present disclosure does not limit the type of machine learning models, model parameters, etc. adopted by each segmentation module.

FIG. 3 is a schematic structural diagram of a text processing module provided by an embodiment of the present disclosure. Referring to FIG. 3, the segmentation modules comprised in the text processing module are connected in parallel, and the first segmentation module and the second segmentation module respectively receive original text data as input; the third segmentation module receives audio data and the original text data as input; the fourth segmentation module receives the original text data as input, and each character comprised in the text data carries timestamp information. The segmentation modules comprised in the text processing module determine the segmentation positions based on their own input to segment the text data, and then the segmentation results of the text data respectively output by the segmentation modules are fused to thereby obtaining a plurality of text segments.

The processing manner of the segmentation modules in the text processing module can refer to the description of the embodiment shown in FIG. 2, and is not described herein again for brevity.

It should be noted that the connection manner of the segmentation modules comprised in the text processing module is not limited to the examples shown in FIG. 2 and FIG. 3, and may be implemented in other manners. For example, the serial connection manner and the parallel connection manner may be combined. For example, the first segmentation module and the second segmentation module are connected in a serial manner, the third segmentation module and the fourth segmentation module are connected in a serial manner, or the first segmentation module and the second segmentation module as a whole are connected in parallel with the third segmentation module and the fourth segmentation module as another whole.

In addition, it should be noted that the connection order of the segmentation modules comprised in the text processing module can be flexibly adjusted according to different scenes. For example, in a scene with many pronunciation objects, segmentation processing may be performed based on the pronunciation objects first, and then based on punctuation analysis, syntactic characteristic analysis, and timestamp information of the audio segments corresponding to the characters.

Figure 4:
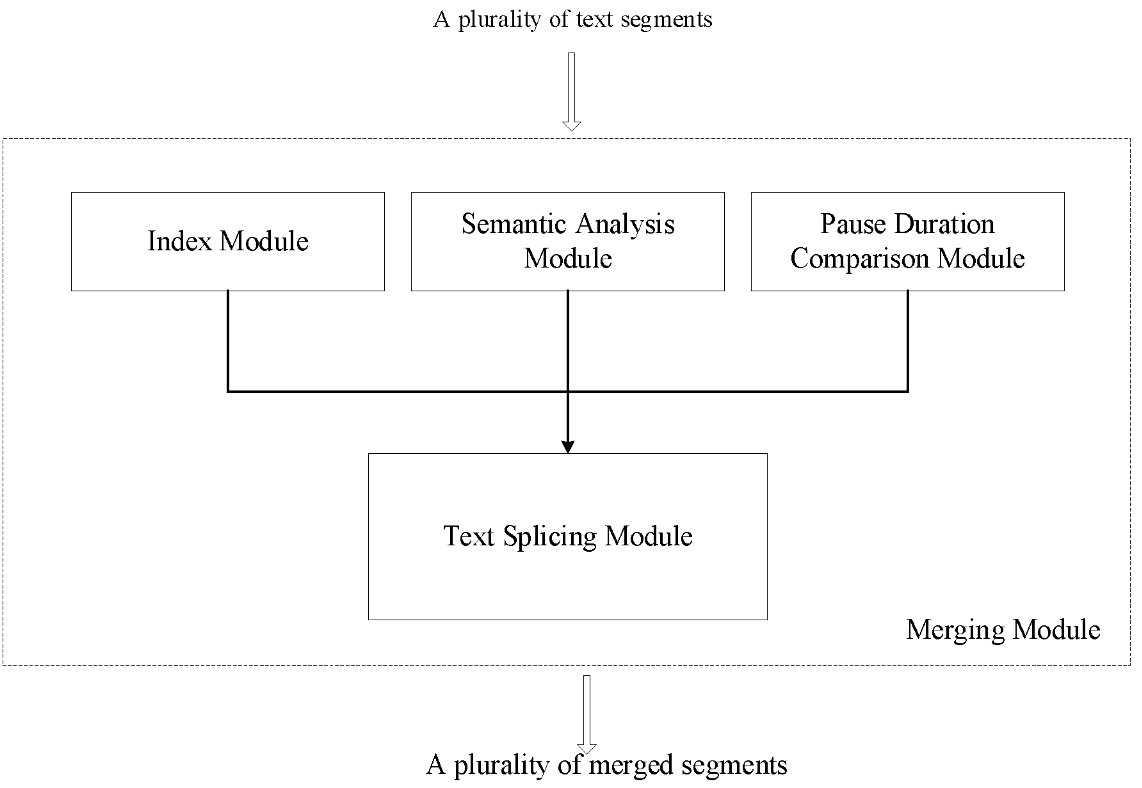
FIG. 4 is a flow diagram of a subtitle generation method provided by another embodiment of the present disclosure.

FIG. 4 is a flow diagram of a subtitle generation method provided by an embodiment of the present disclosure. The embodiment shown in FIG. 4 is mainly used to exemplarily describe how the electronic device merges the text segments. Referring to FIG. 4, when merging text segments, the electronic device may realize it by calling a merging module. The merging module comprises: an index module, a semantic analysis module, a pause duration comparison module and a text splicing module.

The index module can determine whether the input two text segments meets a preset requirement of subtitle sentence length after merging, wherein the preset requirement of subtitle sentence length is mainly a requirement of the retention time of a single subtitle in a video. In order to determine whether the generated single subtitle meets the requirement, the preset requirement of subtitle sentence length can be a preset maximum number of characters per second (CPS) or a preset maximum display time of a single subtitle in the video, and the above two indicators can also better reflect the retention time of a single subtitle in the video.

In addition, the semantic analysis module may determine whether the two input text segments can be merged based on their corresponding semantics, and output identification information indicating whether the text segments can be merged to the text splicing module. For example, in a case where the semantic analysis module outputs an identification 1, it indicates that the text segments may be merged, and in a case where the semantic analysis module outputs an identification 0, it indicates that the text segments may not be merged.

The pause duration comparison module is used for determining a pause duration comparison result between a plurality of adjacent text segments according to the timestamp information of the audio segments corresponding to the characters comprised in the text segments.

The text splicing module determines a merging scheme by combining results or indication information respectively output by the index module, the semantic analysis module and the pause duration comparison module, and splices text segments which meet the preset requirement of subtitle sentence length, have smooth semantics and have shorter pause duration among the text segments so as to obtain a plurality of merged segments.

In an implementation process, the index module and the semantic analysis module can interact data, for example, the index module can output the determining result to the semantic analysis module, the semantic analysis module can determine the combination of text segments meeting the preset requirement of subtitle sentence length, and does not determine whether the semantics are continuous and smooth for the combination of text segments that do not meet the preset requirement of subtitle sentence length, thus reducing the workload of the semantic analysis module and improving the efficiency of subtitle generation.

Suppose that after the text data is segmented, N text segments are obtained, namely, text segment 1, text segment 2 to text segment N.

Illustratively, the electronic device may sequentially determine whether the merging of the text segment 1 and the text segment 2, and the text segment 2 and the text segment 3 meets the preset requirement of subtitle sentence length. If it is determined based on the semantic features that the text segment 1 and the text segment 2 can be merged, the text segment 2 and the text segment 3 can be merged, but the pause duration between the text segment 1 and the text segment 2 is short, the text segment 1 and the text segment 2 are merged to obtain a merged segment 1. Then, the electronic device may determine whether the merged segment 1 and the text segment 3 may be merged according to the preset requirement of subtitle sentence length and the semantics of the text segment, and if so, merge the merged segment 1 and the text segment 3 to obtain a new merged segment 1. Or the electronic device may also determine whether the text segment 3 and the text segment 4 can be merged according to the preset requirement of subtitle sentence length and the semantics of the text segment, and if so, merge the text segment 3 and the text segment 4 to obtain a merged segment 2. The electronic device may compare the subtitle effect of the merged segment obtained by merging the new merged segment 1 with the text segment 3 and the effect of the subtitle of the merged segment obtained by merging the text segment 3 with the text segment 4, and determine a final merging solution for the text segment 3.

By analogy, a merging solution for each text segment can be obtained.

It should be noted that the three steps of determining whether the merging of two text segments meets the preset requirement of subtitle sentence length, determining whether the merging can be performed based on the semantics of the two text segments, and comparing the pause durations between an audio segment and one of the audio segments corresponding to the previous or the next adjacent text segment can be performed in parallel. Then merging is performed by combining the determining results respectively output by the three steps.

It should be further noted that the above-mentioned merging can go through multiple rounds of processing. For example, in a case where the sentence lengths of the merged segments obtained in the first round of merging are all short, the merged segments obtained in the first round may be taken as input, and then another round of merging processing can be performed, so as to obtain a single subtitle sentence length that infinitely approaches the preset requirement of subtitle sentence length.

In another possible embodiment, since the number of characters comprised in the text segment 1 to text segment N is relatively small, and multiple rounds of merging may be required, in the merging process of rounds 1 to ml, merging may be performed based on the preset requirement of subtitle sentence length, the semantics of the text segments, and the pause duration between the audio segments corresponding to the text segments, and merging may be performed in the subsequent merging process of rounds M1+1 to M according to the preset requirement of subtitle sentence length and the semantic features of the text segments.

In some cases, the electronic device may also obtain different merging results according to the preset requirement of subtitle sentence length, in combination with the semantics of the text segments and the pause duration characteristics between the audio segments corresponding to the text segments, that is, a plurality of versions of subtitle data may be obtained, and then subtitle data with a better subtitle effect is selected according to the effects of the subtitle presented by the plurality of versions of subtitle data respectively. For example, a plurality of versions of subtitle data may be presented to a user, so that the user can preview the subtitle effects presented by various subtitle data respectively, and select the subtitle data that meets the user's expectations as the final version of subtitle data based on the user operation.

Through the method provided by the present disclosure, a plurality of text segments are merged, so that a single subtitle with a proper sentence length can be obtained, the single subtitle can be guaranteed to have a proper display time in the video, and the auxiliary understanding effect of the subtitle can be improved. For example, through the solution provided by the present disclosure, a single sentence with a large number of characters can be divided into a plurality of sentences, which are respectively presented by a plurality of single subtitles, thus avoiding the problem that a single subtitle is long, the subtitle needs to be displayed in multiple lines, and the typesetting is confusing, and the display time is long. For short sentences with fast speech speed, the characters corresponding to short sentences can be combined with the characters of adjacent sentences to increase the retention time of subtitles corresponding to the short sentences in the video, so as to ensure that users have enough time to clearly see the contents in subtitles. Moreover, the method provided by the present disclosure determines that the text segment is merged with text segments with stronger content continuity through the pause duration between the audio segments corresponding to the text segment, which can effectively reduce the occurrence of ambiguity and ensure that the subtitle data accurately expresses the content of the audio data.

Figure 5:
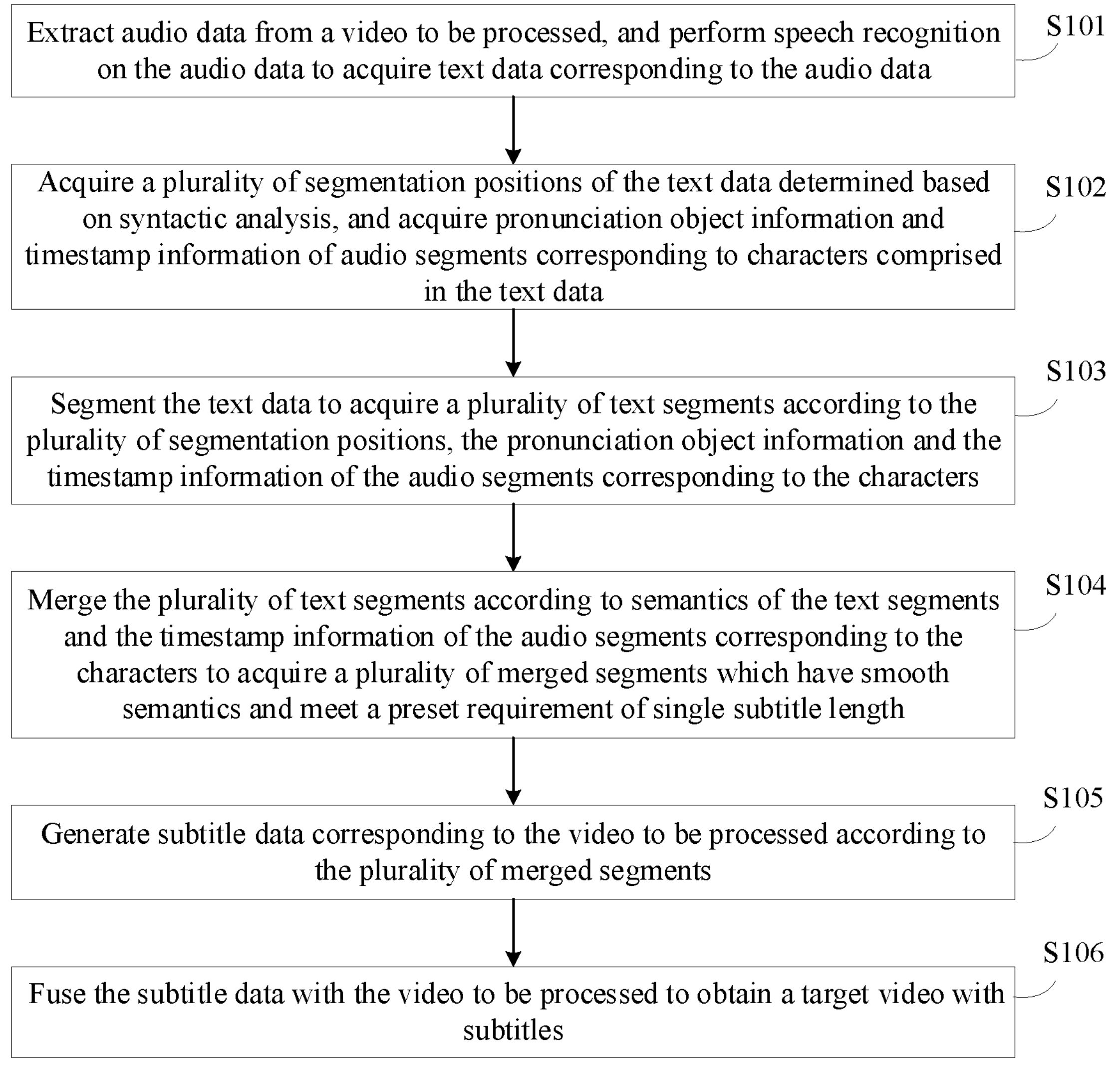
FIG. 5 is a flow diagram of a subtitle generation method provided by another embodiment of the present disclosure.

FIG. 5 is a flow diagram of a subtitle generation method provided by another embodiment of the present disclosure. Referring to FIG. 5, the method of the present embodiment, based on the embodiment shown in FIG. 1, namely after step S104, further comprises:

S106, fusing the subtitle data with the video to be processed to obtain a target video with subtitles.

The video data of the video to be processed is continuous video frame images in the video to be processed. For each single subtitle comprised by the subtitle data, each single subtitle is superimposed on the video frame image of the corresponding display time period according to the preset subtitle display style, so as to obtain the target video with subtitles.

The display time period corresponding to a single subtitle can be determined according to the start time of an audio segment corresponding to the first character and the end time of an audio segment corresponding to the last character which are comprised in the single subtitle, then video frame images in the corresponding display time period are determined based on the start time and the end time corresponding to the single subtitle data, and the single subtitle is superposed on all the video frame images in the corresponding display time period according to a preset display style. By performing the above-described processing for each subtitle in the subtitle data, a target video with subtitles is obtained.

The subtitle sentence length in the target video obtained by the method provided by the present embodiment is more suitable for the user to read, and the user experience can be greatly improved.

Illustratively, an embodiment of the present disclosure also provides a subtitle generation apparatus.

Figure 6:
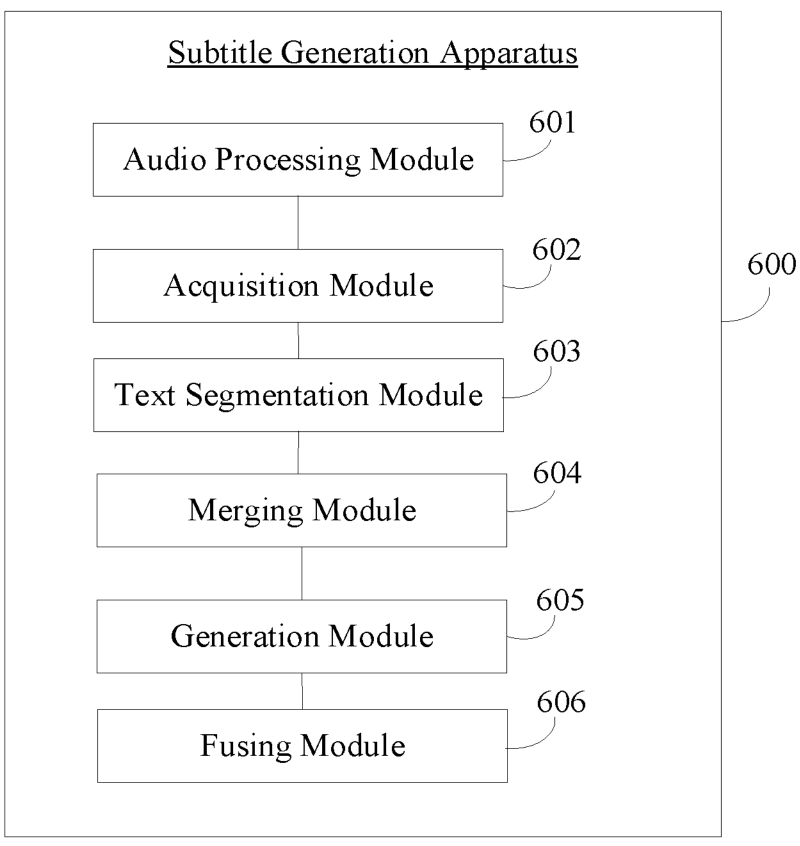
FIG. 6 is a schematic structural diagram of a subtitle generation apparatus provided by an embodiment of the present disclosure.

FIG. 6 is a schematic structural diagram of a subtitle generation apparatus provided by an embodiment of the present disclosure. Referring to FIG. 6, apparatus 600 provided in this embodiment comprises:

- an audio processing module configured to extract audio data from a video to be processed, and performing speech recognition on the audio data to acquire text data corresponding to the audio data;
- an acquisition module configured to acquire a plurality of segmentation positions of the text data determined based on syntactic analysis, and acquire pronunciation object information and timestamp information of audio segments corresponding to characters comprised in the text data;
- a text segmentation module configured to segment the text data to acquire a plurality of text segments according to the plurality of segmentation positions, the pronunciation object information and the timestamp information of the audio segments corresponding to the characters, wherein audio segments corresponding to characters in a text segment belong to a same pronunciation object, and a duration of a blank segment in the audio segments corresponding to the text segment is less than a preset duration;
- a merging module configured to merge the plurality of text segments according to semantics of the text segments and the timestamp information of the audio segments corresponding to the characters to acquire a plurality of merged segments which have smooth semantics and meet a preset requirement of single subtitle length; and
- a generation module configured to generate subtitle data corresponding to the video to be processed according to the plurality of merged segments.

As a possible implementation manner, the merging module 604 is specifically configured to merge the plurality of text segments according to at least one of: whether merged adjacent text segments meet a preset requirement of single subtitle length, whether semantics corresponding to merged adjacent text segments are smooth or a pause duration between the adjacent text segments.

As a possible implementation, the merging module 604 is specifically configured to: determine whether the adjacent text segments meet a merging condition according to whether the merged adjacent text segments meet the preset requirement of single subtitle length; determine whether the adjacent text segments meet the merging condition according to whether the semantics corresponding to the merged adjacent text segments are smooth; for each text segment of the text segments, in response to the text segment and two adjacent text segments before and after the text segment meeting the merging condition, merge the text segment and one of the adjacent text segments with a pause duration between the text segment and the adjacent text segment shorter than a pause duration between the text segment and the other of the adjacent text segments.

As a possible implementation, the preset requirement of single subtitle length comprises at least one of: a Characters Per Second (CPS) requirement or a maximum display duration requirement of a single subtitle in a video.

As a possible implementation, the text segmentation module 603 is specifically configured to input the text data into a text processing module to acquire the plurality of text segments output from the text processing module, wherein the text processing module comprises: a sub-module for text segmentation based on the plurality of segmentation positions, a sub-module for text segmentation based on pronunciation object information of the audio segments corresponding to the characters, and a sub-module for text segmentation based on the timestamp information of the audio segments corresponding to the characters.

As a possible implementation, the text processing module comprises: a first segmentation module for segmenting the text data based on a punctuation analysis; a second segmentation module for segmenting the text data based on syntactic characteristics; a third segmentation module for segmentation based on the pronunciation object information corresponding to the audio data; and a fourth segmentation module for segmentation based on the timestamp information of the audio segments corresponding to the characters in the text data.

As a possible implementation, the first segmentation module, the second segmentation module, the third segmentation module, and the fourth segmentation module are connected in a serial manner, and an input of the third segmentation module comprises an output of the second segmentation module and the audio data, and an input of the fourth segmentation module comprises an output of the third segmentation module and the timestamp information of the audio segments corresponding to the characters.

As a possible implementation, the first segmentation module, the second segmentation module, the third segmentation module and the fourth segmentation module are connected in a parallel manner, and inputs of the first segmentation module and the second segmentation module comprise the text data, an input of the third segmentation module comprises the text data and the audio data, and an input of the fourth segmentation module comprises the timestamp information of the audio segments corresponding to the characters in the text data and the text data.

As a possible implementation, the subtitle data is a SubRip Text (SRT) file.

As a possible implementation, the apparatus 600 further comprises: a fusing module 606 configured to fuse the subtitle data with the video to be processed to obtain a target video with subtitles.

The subtitle generation apparatus provided in this embodiment may be configured to implement the technical solution of any one of the foregoing method embodiments, and the implementation principle and the technical effect are similar, and reference may be made to the detailed description of the foregoing method embodiments, and for brevity, no further description is given here.

Illustratively, the present disclosure also provides an electronic device.

Figure 7:
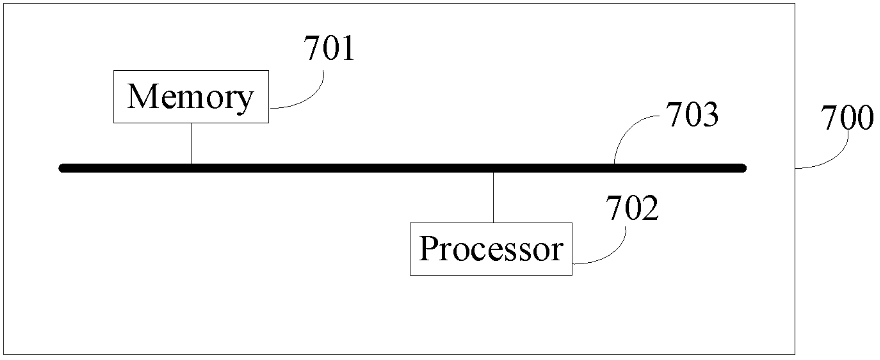
FIG. 7 is a schematic structural diagram of an electronic device provided by an embodiment of the disclosure.

FIG. 7 is a schematic structural diagram of an electronic device provided by an embodiment of the present disclosure. Referring to FIG. 7, an electronic device 700 provided in this embodiment comprises: a memory 701 and a processor 702.

The memory 701 may be a separate physical unit, and may be connected to the processor 702 through a bus 703. The memory 701 and the processor 702 may also be integrated, and implemented by hardware, etc.

The memory 701 is used for storing program instructions, and the processor 702 calls the program instructions to execute the subtitle generation method provided by any one of the above method embodiments.

Alternatively, when part or all of the method of the above embodiment is implemented by software, the electronic device 700 may also comprise only the processor 702. The memory 701 for storing programs is located outside the electronic device 700 and the processor 702 is connected to the memory via circuits/wires for reading and executing the programs stored in the memory.

The processor 702 may be a Central Processing Unit (CPU), a Network Processor (NP), or a combination of a CPU and an NP.

The processor 702 may further comprise a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 701 may comprise volatile memory (volatile memory), such as random-access memory (RAM); the memory may also comprise a non-volatile memory (non-volatile memory), such as a flash memory, a hard disk (HDD) or a solid-state drive (SSD); the memory may also comprise a combination of the above kinds of memories.

The present disclosure also provides a readable storage medium comprising: computer program instructions which, when executed by at least one processor of an electronic device, cause the electronic device to implement a subtitle generation method as provided by any one of the above method embodiments.

The present disclosure also provides a computer program product, which when running on a computer, causes the computer to implement the subtitle generation method provided by any one of the above method embodiments.

It is to be noted that terms used herein to describe relations such as "first" and "second" are only used to distinguish one entity or operation from another, but shall not require or suggest that these entities or operations have such an actual relation or sequence. Furthermore, the term "comprising", "including" or any other variable intends to cover other nonexclusive containing relations to ensure that a process, method, article or apparatus comprising a series of factors comprises not only those factors but also other factors not explicitly listed, or further comprises factors innate to the process, method, article or apparatus. Without more limitations, a factor defined with the sentence "comprising one . . . " does not exclude the case that the process, method, article or apparatus comprising said factor still comprises other identical factors.

The above are only specific embodiments of the present disclosure, which are used to enable those skilled in the art to understand or implement the present disclosure. Various modifications to the disclosed embodiments will be readily apparent to those skilled in the art. The general principles defined herein may be applied to other embodiments without departing from the spirit and scope of the present disclosure. Therefore, the present disclosure will not be limited to these embodiments as shown herein, but is to conform to the broadest scope that is consistent with the principle and novel features as disclosed herein.

What is claimed is:

1. A subtitle generation method, comprising:

extracting audio data from a video to be processed, and performing speech recognition on the audio data to acquire text data corresponding to the audio data;

acquiring a plurality of segmentation positions of the text data determined based on syntactic analysis, and acquiring pronunciation object information and timestamp information of audio segments corresponding to characters comprised in the text data;

segmenting the text data to acquire a plurality of text segments according to the plurality of segmentation positions, the pronunciation object information and the timestamp information of the audio segments corresponding to the characters, wherein audio segments corresponding to characters in a text segment belong to a same pronunciation object, and a duration of a blank segment in the audio segments corresponding to the text segment is less than a preset duration;

merging the plurality of text segments according to semantics of the text segments and the timestamp information of the audio segments corresponding to the characters to acquire a plurality of merged segments which have smooth semantics and meet a preset requirement of single subtitle length;

generating subtitle data corresponding to the video to be processed according to the plurality of merged segments; and fusing the subtitle data with the video to be processed to obtain a target video with subtitles.

2. The subtitle generation method according to claim 1, wherein the merging the plurality of text segments according to the semantics of the text segments and the timestamp information of the audio segments corresponding to the characters comprises:

merging the plurality of text segments according to at least one of: whether merged adjacent text segments meet a preset requirement of single subtitle length, whether semantics corresponding to merged adjacent text segments are smooth or a pause duration between the adjacent text segments.

3. The subtitle generation method according to claim 2, wherein the merging the plurality of text segments according to the semantics of the text segments and the timestamp information of the audio segments corresponding to the character comprises:

determining whether the adjacent text segments meet a merging condition according to whether the merged adjacent text segments meet the preset requirement of single subtitle length;

determining whether the adjacent text segments meet the merging condition according to whether the semantics corresponding to the merged adjacent text segments are smooth;

for each text segment of the text segments, in response to the text segment and two adjacent text segments before and after the text segment meeting the merging condition, merging the text segment and one of the adjacent text segments with a pause duration between the text segment and the adjacent text segment shorter than a pause duration between the text segment and the other of the adjacent text segments.

4. The subtitle generation method according to claim 1, wherein the preset requirement of single subtitle length comprises at least one of: a Characters Per Second (CPS) requirement or a maximum display duration requirement of a single subtitle in a video.

5. The subtitle generation method according to claim 1, wherein the segmenting the text data to acquire the plurality of text segments according to the plurality of segmentation positions, the pronunciation object information and the timestamp information of the audio segments corresponding to the characters comprises:

segmenting the text data to acquire the plurality of text segments output using a plurality of machine learning models.

6. The subtitle generation method according to claim 5, wherein the plurality of machine learning models comprises:

a first machine learning model for segmenting the text data based on a punctuation analysis;

a second machine learning model for segmenting the text data based on syntactic characteristics;

a third machine learning model for segmentation based on the pronunciation object information corresponding to the audio data; and a fourth machine learning model for segmentation based on the timestamp information of the audio segments corresponding to the characters in the text data.

7. The subtitle generation method according to claim 6, wherein the first machine learning model, the second machine learning model, the third machine learning model, and the fourth machine learning model are connected in a serial manner, and an input of the third machine learning model comprises an output of the second machine learning model and the audio data, and an input of the fourth machine learning model comprises an output of the third machine learning model and the timestamp information of the audio segments corresponding to the characters.

8. The subtitle generation method according to claim 6, wherein the first machine learning model, the second machine learning model, the third machine learning model and the fourth machine learning model are connected in a parallel manner, and inputs of the first machine learning model and the second machine learning model comprise the text data, an input of the third machine learning model comprises the text data and the audio data, and an input of the fourth machine learning model comprises the timestamp information of the audio segments corresponding to the characters in the text data and the text data.

9. The subtitle generation method according to claim 1, wherein the subtitle data is a SubRip Text (SRT) file.

10. An electronic device, comprising:

a memory; and a processor coupled to the memory, the processor configured to perform a subtitle generation method comprising:

extracting audio data from a video to be processed, and performing speech recognition on the audio data to acquire text data corresponding to the audio data;

acquiring a plurality of segmentation positions of the text data determined based on syntactic analysis, and acquiring pronunciation object information and timestamp information of audio segments corresponding to characters comprised in the text data;

segmenting the text data to acquire a plurality of text segments according to the plurality of segmentation positions, the pronunciation object information and the timestamp information of the audio segments corresponding to the characters, wherein audio segments corresponding to characters in a text segment belong to a same pronunciation object, and a duration of a blank segment in the audio segments corresponding to the text segment is less than a preset duration;

merging the plurality of text segments according to semantics of the text segments and the timestamp information of the audio segments corresponding to the characters to acquire a plurality of merged segments which have smooth semantics and meet a preset requirement of single subtitle length;

generating subtitle data corresponding to the video to be processed according to the plurality of merged segments; and fusing the subtitle data with the video to be processed to obtain a target video with subtitles.

11. The electronic device according to claim 10, wherein the processor is further configured to:

merge the plurality of text segments according to at least one of: whether merged adjacent text segments meet a preset requirement of single subtitle length, whether semantics corresponding to merged adjacent text segments are smooth or a pause duration between the adjacent text segments.

12. The electronic device according to claim 11, wherein the processor is further configured to:

determine whether the adjacent text segments meet a merging condition according to whether the adjacent text segments meet the preset requirement of single subtitle length after being merged;

determine whether the adjacent text segments meet the merging condition according to whether semantics corresponding to each of the adjacent text segments are smooth after being merged;

for each text segment of the text segments, in response to the text segment and two adjacent text segments before and after the text segment meeting the merging condition, merging the text segment and one of the adjacent text segments with a pause duration between the text segment and the adjacent text segment shorter than a pause duration between the text segment and the other of the adjacent text segments.

13. The electronic device according to claim 10, wherein the preset requirement of single subtitle length comprises at least one of: a Characters Per Second (CPS) requirement or a maximum display duration requirement of a single subtitle in a video.

14. The electronic device according to claim 10, wherein the processor is further configured to:

segment the text data to acquire the plurality of text segments output using a plurality of machine learning models.

15. The electronic device according to claim 14, wherein the plurality of machine learning models comprises:

a first machine learning model for segmenting the text data based on a punctuation analysis;

a second machine learning model for segmenting the text data based on syntactic characteristics;

a third machine learning model for segmentation based on the pronunciation object information corresponding to the audio data; and a fourth machine learning model for segmentation based on the timestamp information of the audio segments corresponding to the characters in the text data.

16. The electronic device according to claim 15, wherein the first machine learning model, the second machine learning model, the third machine learning model, and the fourth machine learning model are connected in a serial manner, and an input of the third machine learning model comprises an output of the machine learning model and the audio data, and an input of the fourth machine learning model comprises an output of the third machine learning model and the timestamp information of the audio segments corresponding to the characters.

17. The electronic device according to claim 15, wherein the first machine learning model, the second machine learning model, the third machine learning model and the fourth machine learning model are connected in a parallel manner, and inputs of the first machine learning model and the second machine learning model comprise the text data, an input of the third machine learning model comprises the text data and the audio data, and an input of the fourth machine learning model comprises the timestamp information of the audio segments corresponding to the characters in the text data and the text data.

18. The electronic device according to claim 10, wherein the subtitle data is a SubRip Text (SRT) file.

19. A non-transitory computer-readable storage medium, on which a computer program is stored, where the program, when executed by a processor, implements a subtitle generation method comprising:

extracting audio data from a video to be processed, and performing speech recognition on the audio data to acquire text data corresponding to the audio data;

acquiring a plurality of segmentation positions of the text data determined based on syntactic analysis, and acquiring pronunciation object information and timestamp information of audio segments corresponding to characters comprised in the text data;

segmenting the text data to acquire a plurality of text segments according to the plurality of segmentation positions, the pronunciation object information and the timestamp information of the audio segments corresponding to the characters, wherein audio segments corresponding to characters in a text segment belong to a same pronunciation object, and a duration of a blank segment in the audio segments corresponding to the text segment is less than a preset duration;

merging the plurality of text segments according to semantics of the text segments and the timestamp information of the audio segments corresponding to the characters to acquire a plurality of merged segments which have smooth semantics and meet a preset requirement of single subtitle length;

generating subtitle data corresponding to the video to be processed according to the plurality of merged segments; and fusing the subtitle data with the video to be processed to obtain a target video with subtitles.

* * * * *